United States Patent
Lin

(10) Patent No.: US 12,465,347 B2
(45) Date of Patent: Nov. 11, 2025

(54) SERIES OF INSTRUMENTS FOR EXPOSURE OF LESIONS POSTERIOR TO TALUS DOME

(71) Applicant: THE FIFTH AFFILIATED HOSPITAL OF GUANGZHOU MEDICAL UNIVERSITY, Guangzhou (CN)

(72) Inventor: Yulin Lin, Guangzhou (CN)

(73) Assignee: THE FIFTH AFFILIATED HOSPITAL OF GUANGZHOU MEDICAL UNIVERSITY, Guangzhuo (CN)

( * ) Notice: Subject to any disclaimer, the term of this patent is extended or adjusted under 35 U.S.C. 154(b) by 0 days.

(21) Appl. No.: 19/108,761

(22) PCT Filed: May 11, 2024

(86) PCT No.: PCT/CN2024/092531
§ 371 (c)(1),
(2) Date: Mar. 5, 2025

(87) PCT Pub. No.: WO2025/081788
PCT Pub. Date: Apr. 24, 2025

(65) Prior Publication Data
US 2025/0255597 A1 Aug. 14, 2025

(30) Foreign Application Priority Data
Oct. 19, 2023 (CN) .......................... 202311351943.4

(51) Int. Cl.
*A61B 17/02* (2006.01)
*A61B 17/00* (2006.01)
(Continued)

(52) U.S. Cl.
CPC ........ *A61B 17/025* (2013.01); *A61B 17/1775* (2016.11); *A61B 90/35* (2016.02); *A61B 2017/00477* (2013.01)

(58) Field of Classification Search
CPC ..................................... A61B 17/025
See application file for complete search history.

(56) References Cited

U.S. PATENT DOCUMENTS 5,098,436 A * 3/1992 Ferrante ............. A61B 17/1659
606/88
10,426,494 B2 * 10/2019 Saltzman ........... A61B 17/1775
(Continued)

FOREIGN PATENT DOCUMENTS

CN 200994798 12/2007
CN 203852396 10/2014
(Continued)

*Primary Examiner* — Christian A Sevilla
(74) *Attorney, Agent, or Firm* — JMB Davis Ben-David

(57) ABSTRACT

The present disclosure relates to the technical field of medical instruments, in particular to a series of instruments for exposure of lesions posterior to talus dome, including: a lesion exposure spreader configured to spread an ankle joint, a retractor configured to laterally retract tissue, and a talus lesion bone extractor configured for lesion debridement and bone extraction. The lesion exposure spreader includes a fixed handle. A supporting strip is fixedly arranged on one side of the fixed handle. A movable handle and a locking mechanism are slidably connected to the supporting strip. Fixing nails are arranged at the tail ends of the fixed handle and the movable handle. The retractor includes a retractor handle. The tail end of the retractor handle is bent and extends downwards, and the bent and extending part is a retractor blade. The talus lesion bone extractor includes a round bone extraction rod and a steering rod. The steering rod is detachably connected to the head end of the round bone extraction rod. A bone cutting end and a bone extrac- (Continued)

tion section are sequentially arranged at the tail end of the round bone extraction rod. The bone cutting end is a conical annular cutting edge. A bone extraction groove is formed in the side wall of the bone extraction section. The bone extraction groove is communicated with the bone cutting end, and a bone block cut by the bone cutting end is extracted from the bone extraction groove. According to the present disclosure, lesion exposure and surgery field illumination are increased.

7 Claims, 7 Drawing Sheets

(51) Int. Cl.
*A61B 17/17* (2006.01)
*A61B 90/35* (2016.01)

(56) References Cited

U.S. PATENT DOCUMENTS

| | | | |
|---|---|---|---|
| 11,596,421 B2* | 3/2023 | Saltzman | A61B 17/1775 |
| 11,849,961 B2* | 12/2023 | Khatibi | A61B 17/1775 |
| 2014/0107798 A1 | 4/2014 | Jeng | |
| 2016/0256293 A1* | 9/2016 | Mauldin | A61F 2/4606 |

FOREIGN PATENT DOCUMENTS

| | | |
|---|---|---|
| CN | 105286967 | 2/2016 |
| CN | 212699036 | 3/2021 |
| CN | 214907457 | 11/2021 |
| CN | 116725593 | 9/2023 |
| JP | 2920167 | 7/1999 |

* cited by examiner ered to spread an ankle joint, a retractor configured to laterally retract tissue, and a talus lesion bone extractor configured for lesion debridement and bone extraction. The lesion exposure spreader includes a fixed handle. A supporting strip is fixedly arranged on one side of the fixed handle. A movable handle and a locking mechanism for limiting relative movement of the movable handle are slidably connected to the supporting strip. Fixing nails are arranged at the tail ends of the fixed handle and the movable handle. The fixed handle fits the movable handle and the locking mechanism to control the two fixing nails to spread and fix the ankle joint and maintain the ankle joint in hyperextension. The retractor includes a retractor handle. The tail end of the retractor handle is bent and extends downwards, and the bent and extending part is a retractor blade. The retractor handle drives the retractor blade to retract soft tissue. The talus lesion bone extractor includes a round bone extraction rod and a steering rod. The steering rod is detachably connected to the head end of the round bone extraction rod. A bone cutting end and a bone extraction section are sequentially arranged at the tail end of the round bone extraction rod. The bone cutting end is a conical annular cutting edge. The round bone extraction rod is inserted into a bone block through the conical annular cutting edge and cuts a bone cylinder. A bone extraction groove is formed in the outer side wall of the bone extraction section. The bone extraction groove is communicated with the bone cutting end, and the cut bone block is extracted from the bone extraction groove.

SERIES OF INSTRUMENTS FOR EXPOSURE OF LESIONS POSTERIOR TO TALUS DOME

CROSS-REFERENCE TO RELATED APPLICATIONS

This is the U.S. National Stage of International Patent Application No. PCT/CN2024/092531, filed on May 11, 2024, which in turn claims the priority of Chinese Patent Application 202311351943.4 filed Oct. 19, 2023.

FIELD OF THE INVENTION

The present disclosure relates to the technical field of medical instruments, and in particular to a series of instruments for exposure of lesions posterior to talus dome.

BACKGROUND OF THE INVENTION

Osteochondral lesions of the talus (OLT) are a common articular cartilage injury, which is often secondary to ankle joint trauma, manifested as talus osteochondritis dissecans and involving subchondral bone, and may be combined with talus bone cysts, thus resulting in ankle joint pain, instability and osteoarthritis, affecting the daily lives of patients, and even causing disability. Conservative treatment may be performed for OTL with shallow lesions, small range and mild symptoms. OLT with ineffective conservative treatment usually requires surgical treatment. Arthroscopic debridement+bone marrow stimulation (BMS) is the most commonly used technology for OLT with clinical symptoms, where the area is less than 107.4 mm2 and/or the diameter is less than 10.2 mm. For larger lesions, open surgical autologous/allogeneic talar osteochondral grafting is required. Since most OLT lesions are located on the posteromedial side of the talar dome, the lesions are deep, and there are bony barriers of the medial and lateral malleoli. The medial malleolus osteotomy is often required to achieve sufficient exposure of intra-articular lesions. The surgery is demanding and difficult, the recovery is slow, cartilage is prone to damage, and ankle joint face bone loss is caused. The postoperative immobilization and fixation are required, and there are complications related to osteotomy.

At present, the exposure effect of instruments for an open surgery of deep OLT lesions is not ideal in clinical practice. However, there is no a series of instruments for lesion exposure for the open surgery of the deep OLT lesions in the medical market. Therefore, the study of a series of instruments for exposure of lesions posterior to talus dome can effectively solve sore points and difficulties in surgery.

SUMMARY OF THE INVENTION

An object of the present disclosure is to overcome the drawbacks and disadvantages of the prior art, and to provide a series of instruments for exposure of lesions posterior to talus dome, which can effectively spread and maintain an ankle joint in hyperextension in an open surgery of OLT lesions, thereby increasing an exposure range posterior to talus dome, increasing surgery field lighting and illumination, and avoiding the disadvantages of the traditional surgery that requires the exposure of lesions through the medial malleolus osteotomy.

The object of the present disclosure may be achieved by the following technical solutions:

A series of instruments for exposure of lesions posterior to talus dome includes: a lesion exposure spreader config- Preferably, the locking mechanism includes an adjusting nut and a fixing nut. The adjusting nut and the fixing nut have internal threads matching the outer wall of the supporting strip. The adjusting nut is arranged on a side of the movable handle close to the fixed handle. The fixing nut is arranged on a side of the movable handle away from the fixed handle.

Preferably, the fixing nails include an upper fixing nail and a lower fixing nail. Through holes are formed in the tail ends of the fixed handle and the movable handle. The upper fixing nail is inserted into the through hole of the fixed handle, and the lower fixing nail is inserted into the through hole of the movable handle. The fit between the fixing nails and the through holes is a clearance fit.

Preferably, the bone cutting end is an annular variable cross-section cutting edge structure with a decreasing cross-sectional area toward the tail end of the round bone extraction rod.

Preferably, two through grooves are formed in the bone cutting end and symmetrically distributed in the side wall of the bone cutting end.

Preferably, a tibial distal target shaping guide plate configured to remove bony barriers and a bone cutting instrument are further included. The tibial distal target shaping guide plate includes a guide plate body and a guide plate extension portion fixedly connected to the guide plate body. A guide groove into which the bone cutting instrument is inserted is formed in the guide plate body. A guide hole for guiding entrance of a guide plate fixing nail is formed in the guide plate extension portion.

Preferably, the guide plate body and the guide plate extension portion are rounded at the corners. The guide plate body and the guide plate extension portion are integrally formed in a drop-shaped structure to conform to tibial distal bone.

Preferably, a light source assembly configured to increase the exposed field of view of lesions is further included. The light source assembly includes a light guide tube. The tail end of the light guide tube is bent and extends downwards.

A bending angle thereof is adapted to a bending position of the retractor handle. The head end of the light guide tube is connected to a cold light source via a light source line.

Preferably, a groove adapted to the size of the light source line is formed in the retractor handle. The head end of the light guide tube is connected to the light source line along the groove. A plurality of stoppers are fixedly arranged on the top of the retractor handle.

Preferably, the retractor blade is further provided with a light guide tube fixing block. A fixing hole adapted to the outer diameter of the light guide tube is formed in the light guide tube fixing block. The light guide tube is mounted on the light guide tube fixing block through the fixing hole.

The present disclosure has the following advantages and benefits over the prior art:

1. A series of instruments for exposure of lesions posterior to talus dome for an open surgery of OLT lesions is composed of a lesion exposure spreader, a retractor, a talus lesion bone extractor, a light source assembly, a tibial distal target shaping guide plate, and a bone cutting instrument. Different instruments are used in different surgical steps, and the series of instruments is inseparable during the whole surgery. By using the series of instruments by medical staff during the open surgery, deep lesions of an ankle joint can be exposed maximally, thereby shortening the surgical time, increasing the success rate of the surgery for patients, reducing the possibility of complications for patients, and facilitating postoperative rehabilitation of patients.

2. By obliquely placing upper and lower fixing nails posterior to the lower tibia and calcaneal tubercle of a patient, and maintaining the ankle joint in hyperextension through the fit between a fixed handle and a movable handle, target tissue may be effectively retracted and exposed, so as to achieve the maximum exposure posterior to the talus dome, whereby the surgical field is not blocked, and the difficulty of lesion exposure is reduced. A sliding step distance between the fixed and movable handles is adjusted by using two nuts, thereby simplifying the surgical operation, eliminating the need for a special person to control the spreader, eliminating the need for repeated adjustment, saving labor, and reducing the surgical strength.

3. The tail end of a retractor blade has the shape of a tongue tip, the size and shape thereof are matched with the side of the talus and the anatomical surface above the calcaneus, and the retractor blade may be stuck at the side of the tissue to facilitate retraction, exposure and position maintenance.

4. The light source assembly includes a cold light source. When the light source assembly is used in combination with the retractor, the tissue can be effectively retracted, and the cold light source can be quickly accessed for lighting, so as to effectively increase the exposed field of view.

5. A groove and a stopper are provided on a retractor handle, and a light source line is attached to on the retractor via the groove, whereby the medical staff is not hindered by the light source line when holding the retractor for surgical operation. The stopper fits the groove to further limit the relative movement of the light source line. A light guide tube fixing block is arranged on the retractor blade, and the irradiation direction of the light guide tube is fixed via the light guide tube fixing block, so as to increase the stability of surgical field lighting.

6. A bone cutting end of the talus lesion bone extractor is set as a conical annular cutting edge, and the conical annular cutting edge is convenient for penetrating bone. In addition, the cutting edge is small, and the contact surface is small, whereby a large wound is avoided when cutting bone, and the possibility of causing complications is reduced. A through groove is also formed in the inner wall of the cutting edge, and the diseased bone is engaged with the through groove during bone chiseling, whereby the whole bone lesion can be easily taken out, and the speed of taking out the talus lesion bone extractor can be increased. A round bone extraction rod and a steering rod are detachably connected, and the length of the steering rod can be selected according to the situation. As the steering rod is longer, the less force is used to rotate the round bone extraction rod, thereby effectively reducing the physical consumption, shortening the surgical time, and increasing the success rate of the surgery.

7. The tibial distal target shaping guide plate is additionally arranged, a guide groove is formed, and target shaping is performed by a bone cutting instrument, whereby bone barriers are removed, and the exposure range of lesions is increased. The limitation of the guide groove can avoid excessive and irregular bone cutting. Compared with oscillating saw cutting used in the prior art, it is unlikely to generate deviation in the osteotomy depth and range and affect the stability of the articular surface or destroy the articular surface during the surgery.

8. The fixed handle, the movable handle, fixing nails, the round bone extraction rod, and the steering rod have a simple shape without a complex structure of fixed connection, which not only simplifies the structure and manufacturing process, but also is easy to assemble and disassemble and is easy to store. In addition, worn parts are replaced separately, thereby reducing the use cost.

In the figures: 1: lesion exposure spreader, 11: fixed handle, 12: supporting strip, 13: movable handle, 14: adjusting nut, 15: fixing nut, 16: upper fixing nail, 17: lower fixing nail, 2: retractor, 21: retractor handle, 22: retractor blade, 23: stopper, 24: light guide tube fixing block, 3: talus lesion bone extractor, 31: round bone extraction rod, 311: bone cutting end, 312: bone extraction section, 313: through groove, 314: bone extraction groove, 32: steering rod, 4: tibial distal target shaping guide plate, 41: guide groove, 42: guide hole, 5: light source assembly, 51: light guide tube, 52: light source line, 53: cold light source, 6: tibia, 7: calcaneus, 8: talus, 9: fibula, and 10: light.

DETAILED DESCRIPTION OF THE EMBODIMENTS

The present disclosure will be described below in further detail with reference to embodiments and drawings, but implementations of the present disclosure are not limited thereto.

As shown in FIG. 1 to FIG. 11, a series of instruments for exposure of lesions posterior to talus dome includes: a lesion exposure spreader configured to spread an ankle joint, a retractor configured to laterally retract tissue, and a talus lesion bone extractor configured for lesion debridement and bone extraction. The lesion exposure spreader includes a fixed handle. A supporting strip is fixedly arranged on one side of the fixed handle. A movable handle and a locking mechanism for limiting relative movement of the movable handle are slidably connected to the supporting strip. Fixing nails are arranged at the tail ends of the fixed handle and the movable handle. The fixed handle fits the movable handle and the locking mechanism to control the two fixing nails to spread and fix the ankle joint and maintain the ankle joint in hyperextension. The retractor includes a retractor handle. The tail end of the retractor handle is bent and extends downwards, and the bent and extending part is a retractor blade. The retractor handle drives the retractor blade to retract soft tissue. The talus lesion bone extractor includes a round bone extraction rod and a steering rod. The steering rod is detachably connected to the head end of the round bone extraction rod. A bone cutting end and a bone extraction section are sequentially arranged at the tail end of the round bone extraction rod. The bone cutting end is a conical annular cutting edge. The round bone extraction rod is inserted into a bone block through the conical annular cutting edge and cuts a bone cylinder. A bone extraction groove is formed in the side wall of the bone extraction section. The bone extraction groove is communicated with the bone cutting end, and the cut bone block is extracted from the bone extraction groove.

Figure 1:
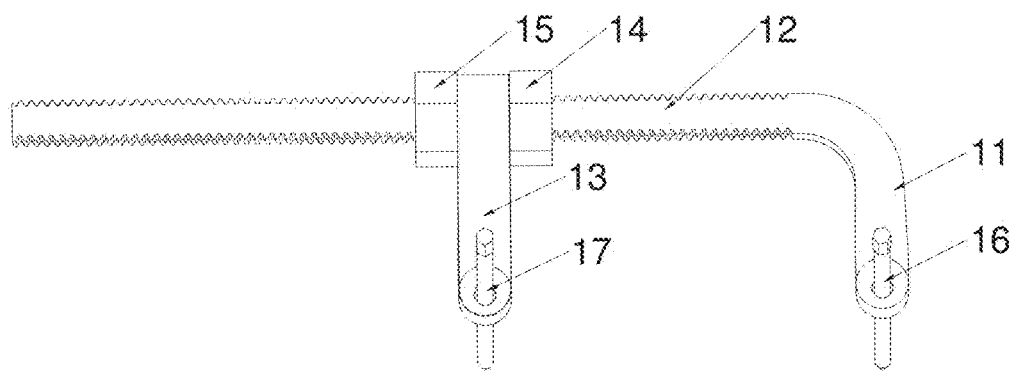
FIG. 1 is a schematic diagram of the structure of a lesion exposure spreader according to the present disclosure.
Figure 2:
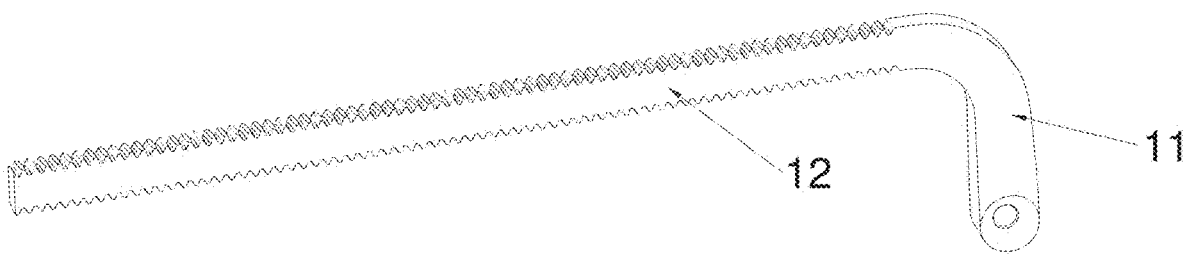
FIG. 2 is a schematic diagram of the structure of a fixed handle and a supporting strip according to the present disclosure.
Figure 3:
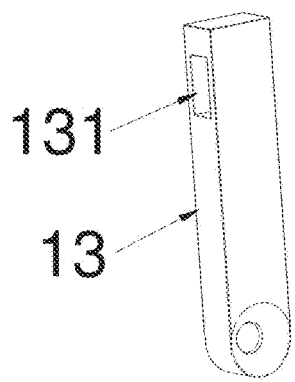
FIG. 3 is a schematic diagram of the structure of a movable handle according to the present disclosure.

In this embodiment, as shown in FIG. 1 to FIG. 3, a sliding hole adapted to the size of the supporting strip is formed in the movable handle, and the movable handle is sleeved on the supporting strip via the sliding hole. The locking mechanism includes an adjusting nut and a fixing nut. The adjusting nut and the fixing nut have internal threads matching the outer wall of the supporting strip. The adjusting nut is arranged on a side of the movable handle close to the fixed handle, and the fixing nut is arranged on a side of the movable handle away from the fixed handle. The adjusting nut fits the fixing nut to limit the relative movement of the movable handle. The fixing nails include an upper fixing nail and a lower fixing nail. Through holes are formed in the tail ends of the fixed handle and the movable handle. The upper fixing nail is inserted into the through hole of the fixed handle, and the lower fixing nail is inserted into the through hole of the movable handle. The fit between the fixing nails and the through holes is a clearance fit.

Figure 5:
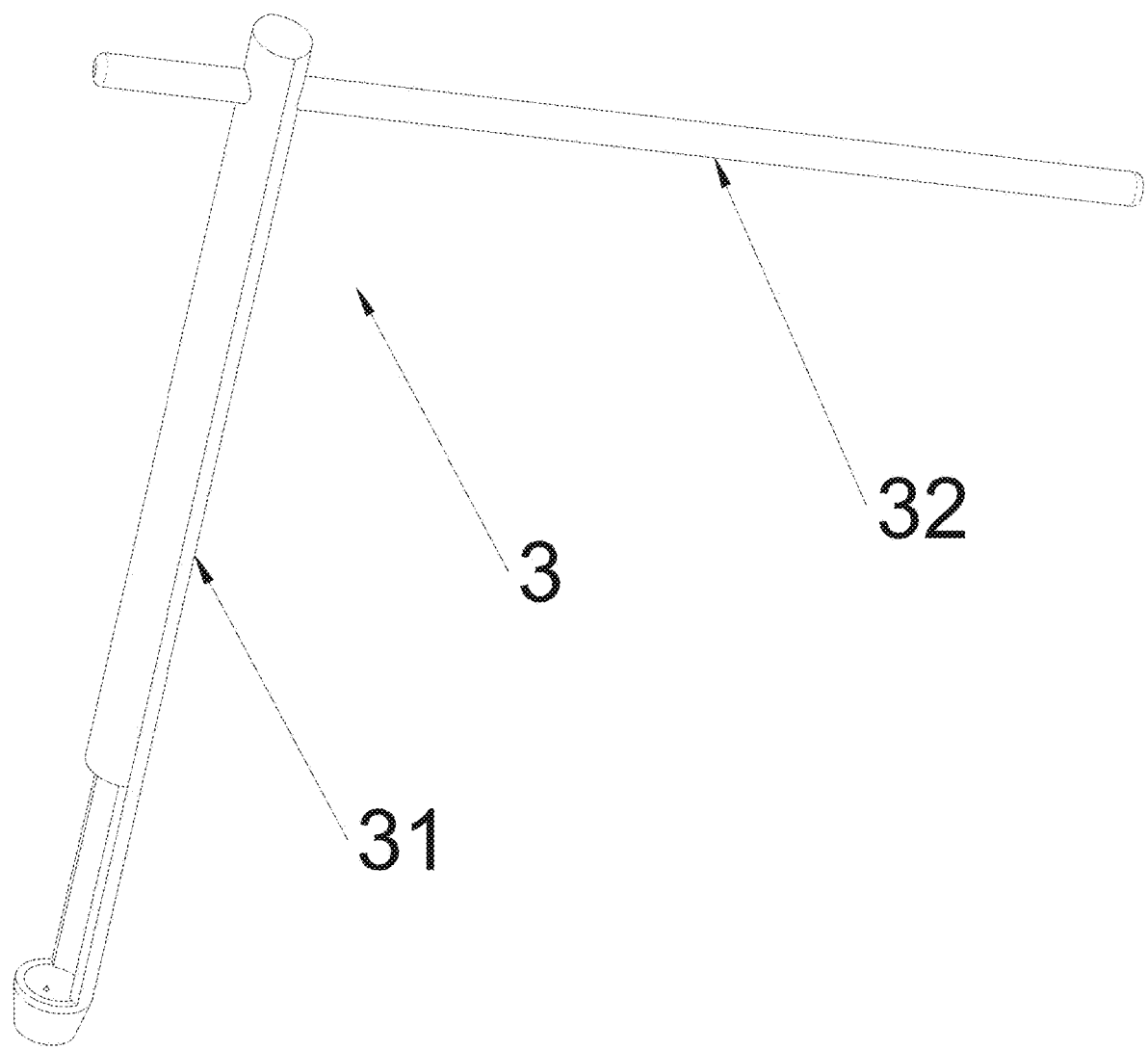
FIG. 5 is a schematic diagram of the structure of a talus lesion bone extractor according to the present disclosure.

As shown in FIG. 5, a connecting hole is formed at the head end of the round bone extraction rod. The steering rod is detachably connected to the round bone extraction rod via the connecting hole. The round bone extraction rod is integrally formed by a solid round rod and a hollow round rod. The hollow round rod is connected to the tail end of the solid round rod. The bone cutting end and the bone extraction section are sequentially arranged on the hollow round rod. The bone extraction groove is an opening formed in the upper part of the hollow round rod.

Figure 6:
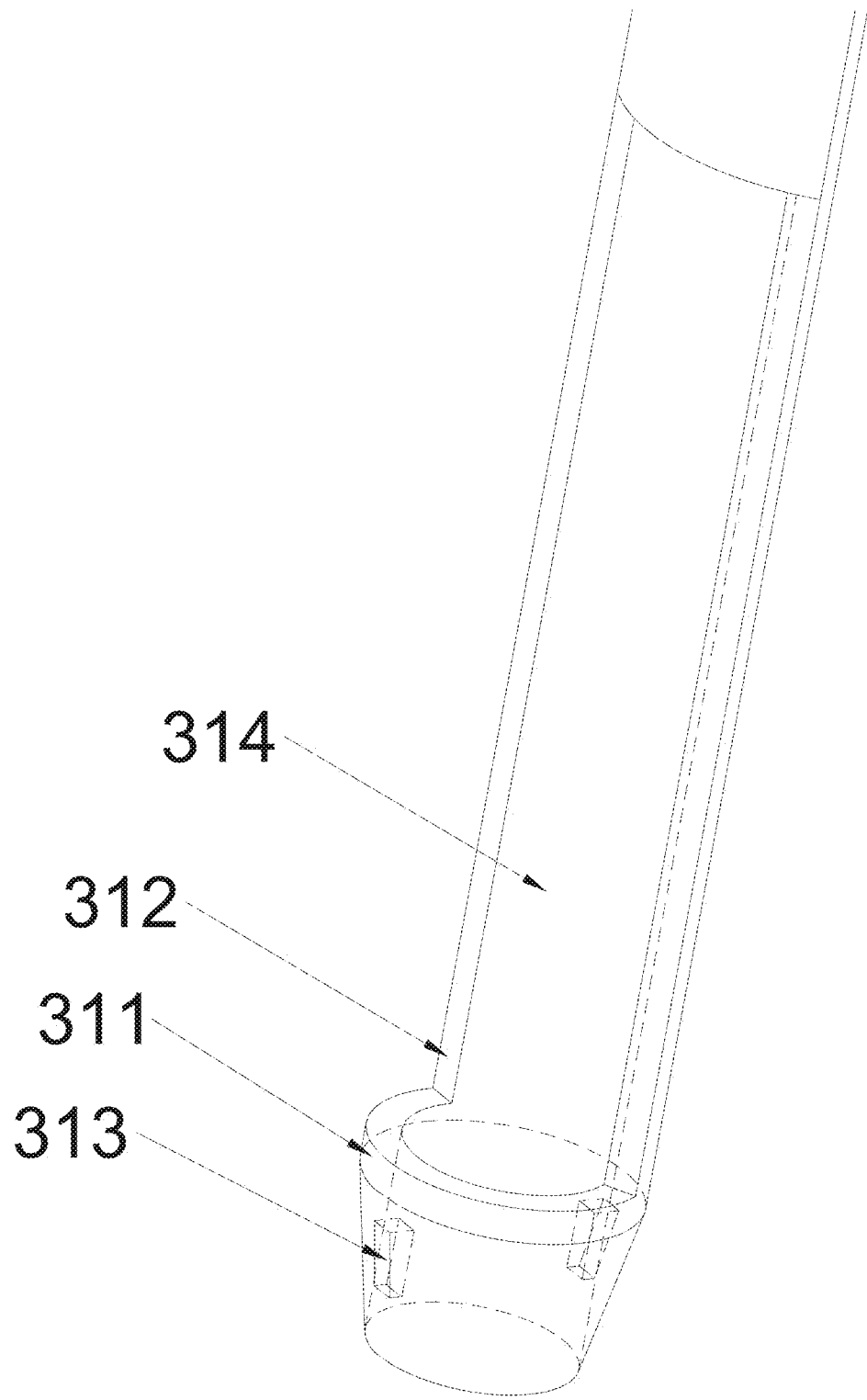
FIG. 6 is a partially enlarged schematic diagram of a talus lesion bone extractor according to the present disclosure.

As shown in FIG. 6, the bone cutting end is an annular variable cross-section cutting edge structure with a decreasing cross-sectional area toward the tail end of the round bone extraction rod.

In this embodiment, two through grooves are formed in the bone cutting end and symmetrically distributed in the side wall of the bone cutting end. The through grooves are rectangular through grooves.

Figure 7:
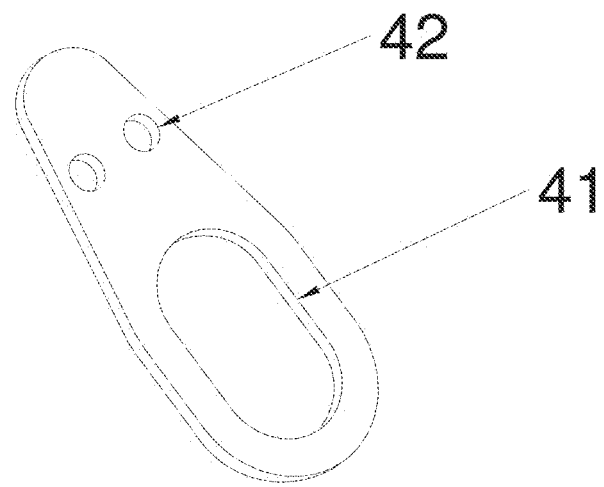
FIG. 7 is a schematic diagram of the structure of a tibial distal target shaping guide plate according to the present disclosure.

As shown in FIG. 7, the series of instruments for exposure of lesions posterior to talus dome further includes a tibial distal target shaping guide plate configured to remove bony barriers and a bone cutting instrument. The tibial distal target shaping guide plate includes a guide plate body and a guide plate extension portion fixedly connected to the guide plate body. A guide groove into which the bone cutting instrument is inserted is formed in the guide plate body. A guide hole for guiding entrance of a guide plate fixing nail is formed in the guide plate extension portion.

In this embodiment, the guide plate body and the guide plate extension portion are rounded at the corners. The guide plate body and the guide plate extension portion are integrally formed in a drop-shaped structure to conform to tibial distal bone.

Figure 8:
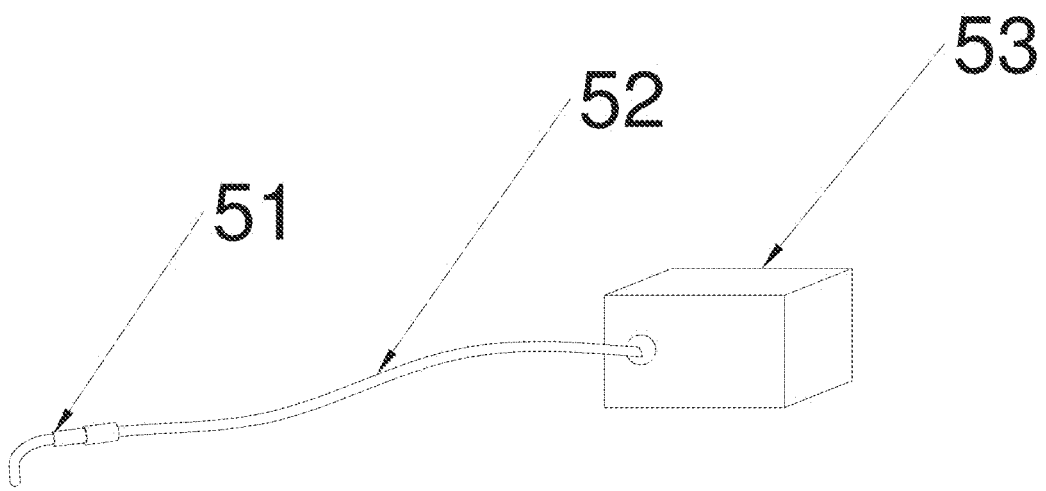
FIG. 8 is a schematic diagram of the structure of a light source assembly according to the present disclosure.

As shown in FIG. 8, the series of instruments for exposure of lesions posterior to talus dome further includes a light source assembly configured to increase the exposed field of view of lesions. The light source assembly includes a light guide tube. The tail end of the light guide tube is bent and extends downwards. A bending angle thereof is adapted to a bending position of the retractor handle. The head end of the light guide tube is connected to a cold light source via a light source line.

The lesion exposure spreader and the retractor may be made of medical stainless steel by a 3D printing technology. The talus lesion bone extractor may be made of CNC high-strength stainless steel. The tibial distal target shaping guide plate may be made of CNC high-toughness elastic shapeable stainless steel. The standard tolerance complies with IT14 standard.

The ankle joint is composed of a joint at the lower end of tibia and fibula and an articular surface (talus dome) at the upper part of talus. The motion characteristics of the ankle joint are as follows. The ankle joint moves along the medial plane, and the axis is from the middle point of the tip of the medial malleolus to the anterior edge of the tip of the lateral malleolus through the femoral sinus, and forms an angle of 68°-88° with the sagittal axis of a human body and an angle of about 20° with the coronal axis. The flexion and extension activities are accompanied by mild varus-valgus and adduction-abduction.

Figure 9:
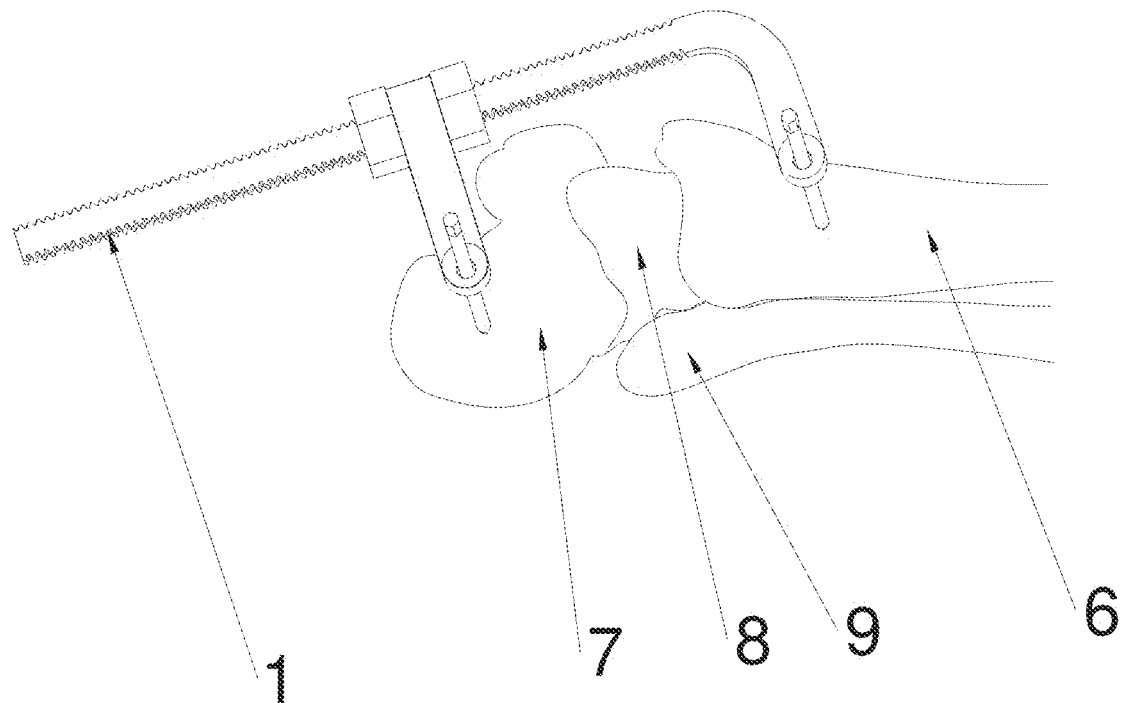
FIG. 9 is a schematic diagram of the use of a lesion exposure spreader according to the present disclosure.
Figure 10:
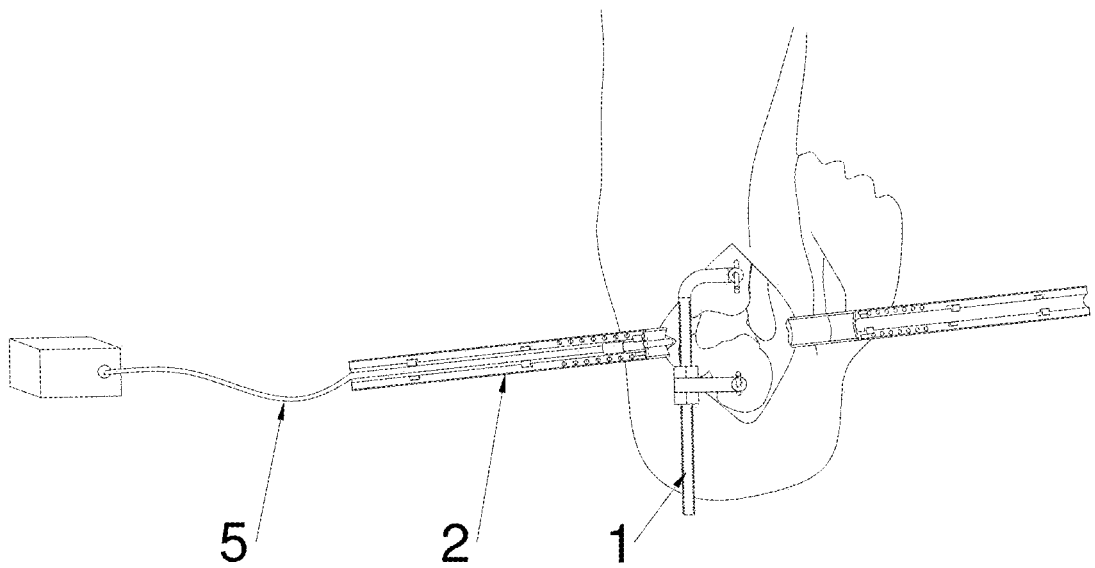
FIG. 10 is a schematic diagram of the fitted use of a lesion exposure spreader, a retractor and a light source assembly according to the present disclosure.

The series of instruments is used based on the following steps:

At S1, an ankle joint is spread and fixed by using a lesion exposure spreader (the use effect is as shown in FIG. 9 and FIG. 10).

This step includes the following operations:
  a. Exposure of posterior to talus dome: Generally, a patient is in a prone position, and an incision is made at the medial side of the achilles tendon. The length of the incision may be increased or decreased based on that the patient is fat or thin. Generally, the length of the incision is about 5-7 cm. The incision is separated to the posterior side of the ankle joint along the medial side of the pollicis longus adductor tendon, and the posterior joint capsule is cut.

b. Back stretch of ankle joint: The upper surface of a foot is raised, whereby the angle of the ankle joint is less than 90 degrees.

c. Separation of soft tissue: The incision is separated to the posterior of the ankle joint, the posterior joint capsule is exposed, a small incision of 0.5 cm is made in the middle of the posterior side of the lower tibia (3-6 cm from the articular surface), and the tissue is separated from small vessels.

d. Placement of fixing nails: An upper fixing nail is drilled from lower posterior to upper anterior on the posterior side of the lower tibia, and a lower fixing nail is drilled from lower posterior to upper anterior in a first metatarsophalangeal direction from calcaneal tubercle to calcaneal axis.

e. Assembly of lesion exposure spreader: The tail end of a fixed handle is sleeved on the upper fixing nail through a through hole, and the tail end of a movable handle is sleeved on the lower fixing nail. An adjusting nut is screwed on the tail end of a supporting strip, and then the head end of the movable handle is sleeved on the supporting strip through a sliding hole. The position of the movable handle is adjusted, and then a fixing nut is screwed.

f. Adjustment and fixing of spreading distance: When the ankle joint is stretched back, the ankle joint is gradually spread. First, the degree of spreading of the ankle joint is adjusted by screwing the adjusting nut. Finally, the spreading distance of the ankle joint is fixed by tightening the fixing nut.

In this embodiment, the inner diameter of the through hole is 4.5 mm, and the outer diameter of the fixing nail is 3.5 mm. The supporting strip is a rack or a threaded rod. The length of the fixed handle is 5 cm, and the length of the supporting strip is 12 cm. The fixed handle and the supporting strip have an L-shaped structure formed integrally. The length of the fixing nail is 10 cm, and the tail end of the fixing nail is a prismatic tip drill.

Figure 11:
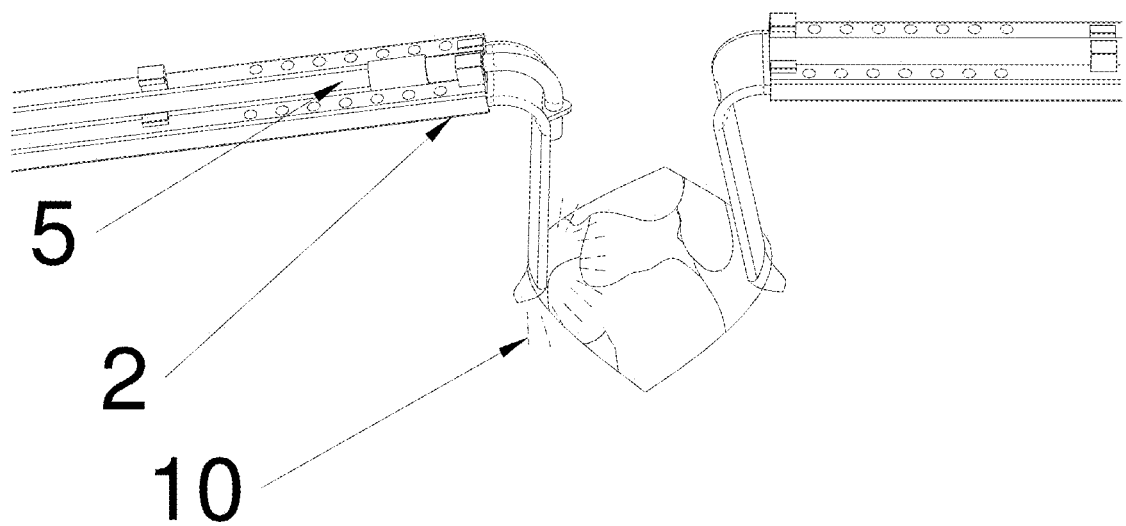
FIG. 11 is a schematic diagram of the fitted use of a retractor and a light source assembly according to the present disclosure.

At S2, tissue is laterally retracted by using a retractor (the use effect is as shown in FIG. 10 and FIG. 11).

In this step, two retractors are placed on both sides of the incision, namely a retractor with a light source assembly and a retractor without a light source assembly. The tail end of a retractor blade is placed in a gap on the medial or lateral side of the talus. The tissue is laterally retracted with the lateral side as the fulcrum.

Figure 4:
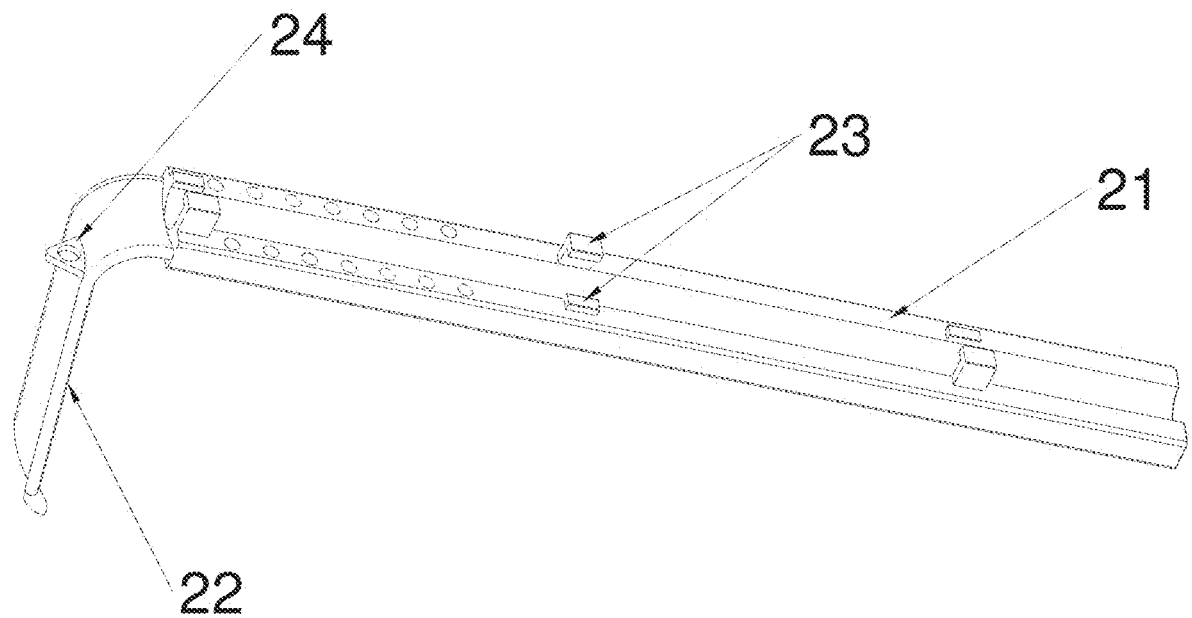
FIG. 4 is a schematic diagram of the structure of a retractor according to the present disclosure.

In this embodiment, as shown in FIG. 4, the retractor handle and the retractor blade have an L-shaped structure formed integrally. The tail end of the retractor blade is bent and extends inwards at a certain angle, the bent and extending part is a blunt tip, and the blunt tip is rounded. An angle of downward bending and extending of the retractor handle is 80°, the length of the retractor handle is 13 cm, and the length of the retractor blade is 5 cm. For the retractor with a light source assembly, a groove adapted to the size of a light source line is formed in the retractor handle. The head end of a light guide tube is connected to the light source line along the groove. A plurality of stoppers are fixedly arranged on the top of the retractor handle, and the stoppers fit the groove to limit the relative movement of the light source line. A light guide tube fixing block is also arranged on the retractor blade. A fixing hole adapted to the outer diameter of the light guide tube is formed in the light guide tube fixing block. The light guide tube is mounted on the light guide tube fixing block through the fixing hole. Light is emitted from a cold light source along the light source line and is irradiated downwards under the guidance of the light guide tube, so as to increase the lighting and illumination of the surgery field. The light may also adjust the light source brightness and a soft light state thereof via the cold light source.

At S3, a lesion exposure range is determined.

When the lesion exposure range in the above-mentioned steps is not sufficient to expose lesions, but is more than half of the area, the talus lesion bone extractor may be used for lesion debridement and bone extraction.

When the lesion exposure range in the above-mentioned steps is not sufficient to expose lesions and is less than half of the area, the operation of bone extraction or bone grafting cannot be performed directly, periosteum stripping and exposure may be performed on the posterior edge of the corresponding tibial articular surface above the lesion, and then a tibial distal target shaping guide plate with a corresponding size is selected according to the size of the lesion for bone barrier removal, so as to increase the exposure range of the lesion. Finally, the talus lesion bone extractor may be used for lesion debridement and bone extraction.

Figure 12:
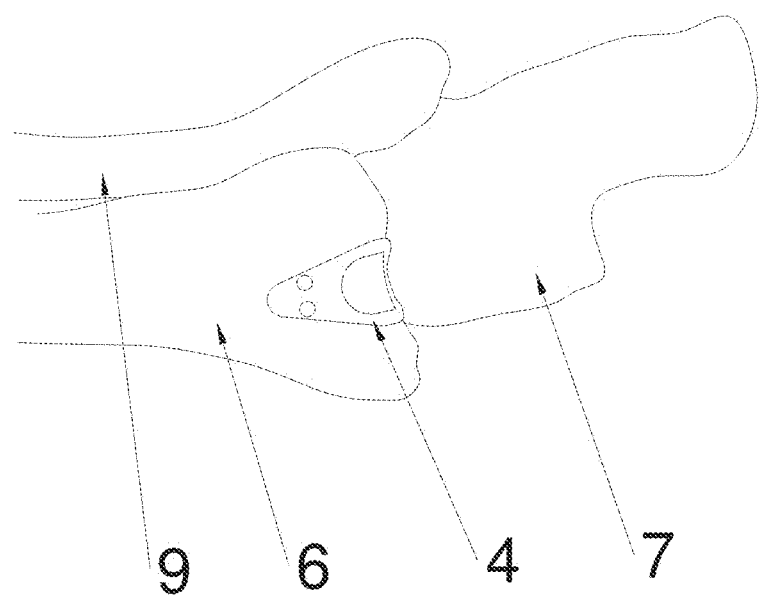
FIG. 12 is a schematic diagram of the use of a tibial distal target shaping guide plate according to the present disclosure.

At S4, bony barriers are removed by using a tibial distal target shaping guide plate (the use effect is as shown in FIG. 12).

This step includes the following operations:

a. Shaping of tibial distal target shaping guide plate: A tibial distal target shaping guide plate of an appropriate size is selected, and shaped according to the articular bone characteristics and anatomical characteristics of the distal tibia of a large sample.

b. Adjustment of tibial distal target shaping guide plate: The shaped tibial distal target shaping guide plate fits normal anterior and posterior edges of the distal tibia. If there is deviation in the goodness of fit, the tibial distal target shaping guide plate is pre-bent through needle-holding pliers or sharp-nose pliers, whereby the tibial distal target shaping guide plate fits the distal tibia.

c. Fixing of tibial distal target shaping guide plate: A guide plate fixing nail is drilled at a guide hole of the tibial distal target shaping guide plate.

d. Grinding of bone: A corresponding curved osteotome and shaped bone chisel are used for chiseling bone or a drill ball head is used for grinding bone at a guide groove of the tibial distal target shaping guide plate, so as to form a targeted exposure and operation channel with a semi-circular bottom and an inclined upper side.

In this embodiment, the guide groove is an oblong through hole formed in a guide plate body, and the guide groove may be set as an oblong through hole with an inner diameter of 7 mm×a long axis of 12 mm, an inner diameter of 8 mm×a long axis of 13 mm, or an inner diameter of 9 mm×a long axis of 14 mm. The guide hole is a round through hole formed in a guide plate extension portion. At least two guide holes are formed in the guide plate extension portion, and the inner diameter of the guide holes is 2 mm. The guide plate body is stamped and formed from a 304 stainless steel sheet with a thickness of 0.5 mm. The distance between the outer diameter of the guide plate body and the inner diameter of the guide groove is 2 mm. The guide plate body may be stamped and formed into sheets of three corresponding specifications according to the size of the guide groove. According to the shape of the distal tibia, the guide plate body may be easily bent or shaped by pliers, whereby the tibial distal target shaping guide plate fits the anterior and posterior edges of the tibia. An osteotome, a bone chisel or a drill may be used as a bone cutting instrument.

At S5, lesion debridement and bone extraction are performed by using a talus lesion bone extractor.

In this step, a talus lesion bone extractor with an appropriate diameter is selected. The head end of the round bone extraction rod is held by hand, the bone cutting end is inserted into the bone vertically downwards toward the posterior lip of the distal tibia, and then the steering rod is inserted at the head end of the round bone extraction rod. Then the round bone extraction rod is gently rotated through the steering rod to cut a bone cylinder. After the cutting is completed, the round bone extraction rod is gently knocked and pulled, and a bone block is taken out of the body and extracted.

In this embodiment, the length of the bone cutting end is 6 mm, and the length of the bone extraction section is 30 mm. The bone cutting end may be provided with annular conical cutting edges with outer diameters of 7 mm, 8 mm and 9 mm. The wall thickness of the bone cutting end is 0.75 mm.

In general, the lesion exposure spreader, the retractor, the talus lesion bone extractor, and the tibial distal target shaping guide plate of the present disclosure are sized to be suitable for practical clinical application, and conform to ankle joint anatomy, joint motion characteristics and biomechanics. In addition, deep lesions can be exposed without integral osteotomy, thereby avoiding ankle joint facet bone loss and cartilage injury, facilitating postoperative recovery of patients, and avoiding osteotomy-related complications.

The embodiments described above represent only a few implementations of the present disclosure and are described in more detail, which should not be construed as limiting the scope of the present disclosure. It will be appreciated by those of ordinary skill in the art that numerous variations and modifications may be made to the present disclosure without departing from the concept of the present disclosure, which fall within the protection scope of the present disclosure. Therefore, the protection scope of the present disclosure should be determined by the appended claims.

The invention claimed is:

1. A series of instruments for exposure of lesions posterior to a talus dome, comprising:
    a lesion exposure spreader configured to spread an ankle joint, the lesion exposure spreader comprising a fixed handle, a supporting strip being fixedly arranged on one side of the fixed handle, a movable handle and a locking mechanism for limiting relative movement of the movable handle being slidably connected to the supporting strip, fixing nails being configured to be arranged at tail ends of the fixed handle and the movable handle, and the fixed handle fitting the movable handle and the locking mechanism to control the two fixing nails to spread and fix the ankle joint and maintain the ankle joint in hyperextension,
    wherein the fixing nails comprise an upper fixing nail and a lower fixing nail, through holes are formed in the tail ends of the fixed handle and the movable handle, the upper fixing nail is inserted, in use, into the through hole of the fixed handle, the lower fixing nail is inserted, in use, into the through hole of the movable handle, and the fixing nails are capable of forming a clearance fit with the through holes when in use;
    a retractor configured to laterally retract tissue, the retractor comprising a retractor handle, a tail end of the retractor handle being bent and extending downwards, the bent and extending part being a retractor blade, and the retractor handle driving the retractor blade to retract soft tissue;
    a talus lesion bone extractor configured for lesion debridement and bone extraction, the talus lesion bone extractor comprising a round bone extraction rod and a steering rod, the steering rod being detachably connected to a head end of the round bone extraction rod, a bone cutting end and a bone extraction section being sequentially arranged at a tail end of the round bone extraction rod, the bone cutting end being a conical annular cutting edge, the round bone extraction rod is capable of being inserted into a bone block through the conical annular cutting edge and is capable of cutting a bone cylinder, a bone extraction groove being formed in a side wall of the bone extraction section, the bone extraction groove being communicated with the bone cutting end, and the bone extraction groove being configured to allow a cut bone block to be extracted therefrom;
    a tibial distal target shaping guide plate configured to remove bony barriers, the tibial distal target shaping guide plate comprising a guide plate body and a guide plate extension portion fixedly connected to the guide plate body, a guide groove being formed in the guide plate body, and a guide hole for guiding entrance of a guide plate fixing nail being formed in the guide plate extension portion; and
    a light source assembly configured to increase the exposed field of view of lesions, the light source assembly comprising a light guide tube, a tail end of the light guide tube being bent and extending downwards, a bending angle thereof being adapted to a bending position of the retractor handle, and a head end of the light guide tube being connected to a cold light source via a light source line,
    wherein the series of instruments for exposure of lesions posterior to the talus dome is used based on the following steps:
    S1: spreading and fixing the ankle joint by using the lesion exposure spreader;
    S2: laterally retracting tissue by using the retractor;
    S3: determining a lesion exposure range;
    S4: removing bony barriers by using the tibial distal target shaping guide plate; and
    S5: performing lesion debridement and bone extraction by using the talus lesion bone extractor.

2. The series of instruments for exposure of lesions posterior to the talus dome according to claim 1, wherein the locking mechanism comprises an adjusting nut and a fixing nut, the adjusting nut and the fixing nut have internal threads matching the outer wall of the supporting strip, the adjusting nut is arranged on a side of the movable handle close to the fixed handle, and the fixing nut is arranged on a side of the movable handle away from the fixed handle.

3. The series of instruments for exposure of lesions posterior to the talus dome according to claim 1, wherein the bone cutting end is an annular variable cross-section cutting edge structure with a decreasing cross-sectional area toward the tail end of the round bone extraction rod.

4. The series of instruments for exposure of lesions posterior to the talus dome according to claim 1, wherein two through grooves are formed in the bone cutting end and symmetrically distributed in a side wall of the bone cutting end.

5. The series of instruments for exposure of lesions posterior to the talus dome according to claim 1, wherein the guide plate body and the guide plate extension portion are rounded at the corners, and the guide plate body and the guide plate extension portion are integrally formed in a drop-shaped structure to conform to tibial distal bone.

6. The series of instruments for exposure of lesions posterior to the talus dome according to claim 1, wherein a groove adapted to the size of the light source line is formed in the retractor handle, the head end of the light guide tube is connected to the light source line along the groove, and a plurality of stoppers are fixedly arranged on the top of the retractor handle.

7. The series of instruments for exposure of lesions posterior to the talus dome according to claim 1, wherein the retractor blade is further provided with a light guide tube fixing block, a fixing hole adapted to the outer diameter of the light guide tube is formed in the light guide tube fixing block, and the light guide tube is configured to be mounted on the light guide tube fixing block through the fixing hole.

* * * * *